United States Patent [19]

Cohen

[11] Patent Number: 4,889,076
[45] Date of Patent: Dec. 26, 1989

[54] NEST TRAP FOR LAYING HENS

[75] Inventor: William Cohen, Ichud, Israel

[73] Assignee: M. G. H. Automation Systems, Ichud, Israel

[21] Appl. No.: 190,990

[22] Filed: May 6, 1988

[30] Foreign Application Priority Data

Feb. 10, 1986 [IL] Israel .................................... 77833

[51] Int. Cl.⁴ ............................................ A01K 31/16
[52] U.S. Cl. ..................................................... 119/50
[58] Field of Search ............................. 119/48, 50, 49

[56] References Cited

U.S. PATENT DOCUMENTS

| | | | |
|---|---|---|---|
| 52,675 | 2/1866 | Campbell | 119/50 |
| 348,356 | 8/1886 | Spaulding | 119/50 |
| 1,857,341 | 5/1932 | Abbink | 119/50 |
| 2,105,879 | 1/1938 | De Hart | 119/50 |
| 2,260,028 | 10/1941 | Houston | 119/50 |
| 2,578,247 | 12/1951 | Hufferbert | 119/50 |
| 4,188,911 | 2/1986 | Rafaely | 119/48 |

Primary Examiner—Paul J. Hirsch
Attorney, Agent, or Firm—Benjamin J. Barish

[57] ABSTRACT

A trap for a laying hens nest movable by the hen when entering the nest to a closed position obstructing the front entrance to prevent another hen from entering, and when leaving the nest to an open position to permit another hen to enter the nest. The trap is pivotably mounted to an intermediate position at the top of the nest between its front entrance and the back wall, and comprises a front member pivotably mounted to the intermediate position at the top of the nest, a back member mounted to the upper end of the front member, and an over-center spring connection between the two members.

17 Claims, 2 Drawing Sheets

NEST TRAP FOR LAYING HENS

BACKGROUND OF THE INVENTION

The present invention relates to nest traps for laying hens, particularly turkeys.

Turkey nests are commonly provided with a trap which is automatically movable to a closed or open position by the hen using the nest. Thus, when a hen enters the nest, the trap is automatically actuated to its closed position to prevent another hen from entering; and when the hen within the nest leaves it, the trap is automatically opened to permit another hen to enter.

The nest traps now in use, generally mounted at the front entrance of the nest, are not very reliable in operation. Thus, they frequently close while the nest is not occupied by a hen, thereby removing the nest from usefulness; or they frequently do not close when a hen has entered, thereby permitting another hen to enter and interfere with the hen already there.

An object of the present invention is to provide a nest trap having advantages in the above respects.

BRIEF SUMMARY OF THE INVENTION

According to the present invention, there is provided a nest trap for a laying hens nest having a front entrance through which the hen enters and exits, a back wall and a top, which trap is movable by the hen when entering the nest to a closed position obstructing the front entrance to prevent another hen from entering, the trap being movable by the hen when leaving the nest to an open position to permit another hen to enter the nest.

More particularly, the nest trap comprises a front member pivotably mounted to the top of the nest at the intermediate position; a back member mounted to the upper end of the front member; and a spring providing an over-center spring connection between the two members effective to stably maintain the back member within the nest and the front member in a non-obstructing position with respect to the front entrance, in the open position of the trap, and effective to stably maintain the back member near the back wall of the nest and the front member obstructing the front entrance, in the closed position of the trap.

According to a still further important feature in the described preferred embodiment, the back member is pivotably mounted to the upper end of the front member, the spring being connected to the upper end of the back member to provide a second over-center spring connection effective, when both the front member and the back member are moved out of the cage to a non-obstructing position with respect to the front entrance, to also stably maintain the back member in the non-obstructing position with respect to the front entrance. Such an arrangement is particularly advantageous when the laying nest is first placed into use with a flock of turkeys in order to enable the turkeys to become acclimatized to the laying nest.

Further features and advantages will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
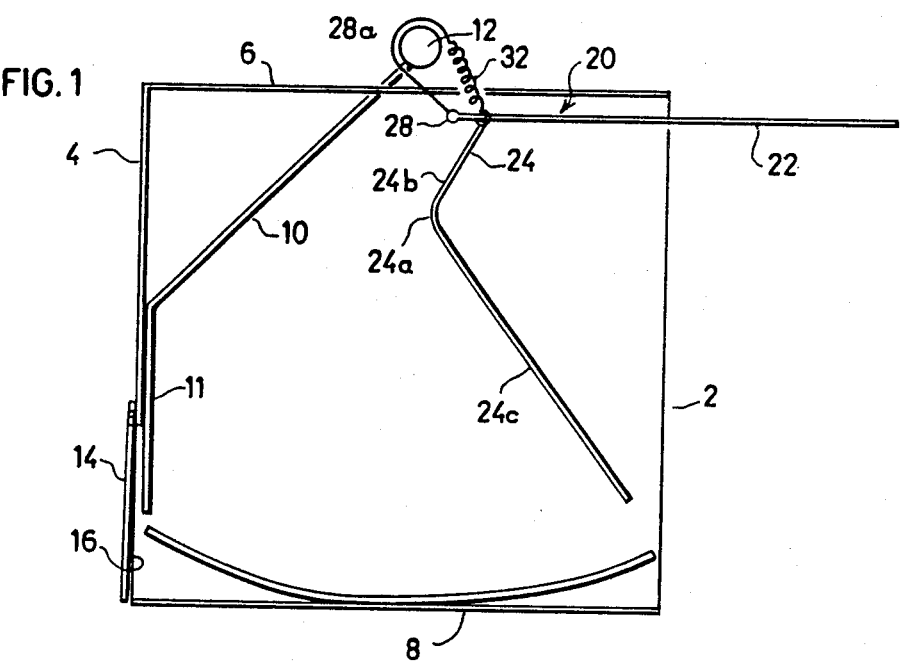
FIG. 1 is a side elevational view illustrating a laying nest including a nest trap constructed in accordance with the present invention.

The nest trap illustrated in the drawings is particularly useful for turkeys. The nest is in the form of an enclosure having a front entrance 2, a back wall 4, a top wall 6, and a bottom wall 8. The nest may be of the type described in our prior U.S. Pat. No. 4,188,911, which includes an ejector 10 fixed to a shaft 12 at the top of the nest. Ejector 10 includes a section 11 normally positioned adjacent to the back wall 4 of the nest, and a pivotable flap 14 effective to remove any eggs within the nest through an opening 16 in the back wall 4.

Shaft 12 is actually coupled to the ejectors 10 of a plurality of nests arranged in a line. The shaft is periodically driven by a motor (not shown) to swing ejector 10 of each nest first from the back wall 4 towards the front entrance 2, whereupon ejector section 11 drives any hen within the nest out through the front entrance, and then swings back to its original position wherein the lower flap 14 moves any egg within the nest out through opening 16.

According to the present invention, such a nest is provided with a trap, generally designated 20. FIG. 1 illustrates the nest trap 20 in its open position permitting a hen to enter the nest via the front entrance 2. However, when a hen does enter the nest, the hen engages a part of the trap 20 so as to automatically move the trap to its closed position in order to obstruct the front entrance 2 and thereby prevent another hen from entering the nest while the nest is occupied by the first hen. When the occupying hen leaves the nest, the hen engages the nest trap to automatically move it to its open position thereby making the nest available for use by another hen.

One of the significant features of nest trap 20, as shown in FIG. 1, is that it is pivotably mounted to the top 6 of the nest at an intermediate position of the nest, i.e. between its front entrance 2 and its back wall 4. This is to be distinguished from the arrangements in present use wherein the nest trap is generally mounted to the front wall of the nest. The new illustrated arrangement provides a number of advantages, as will be described below.

Figure 2:
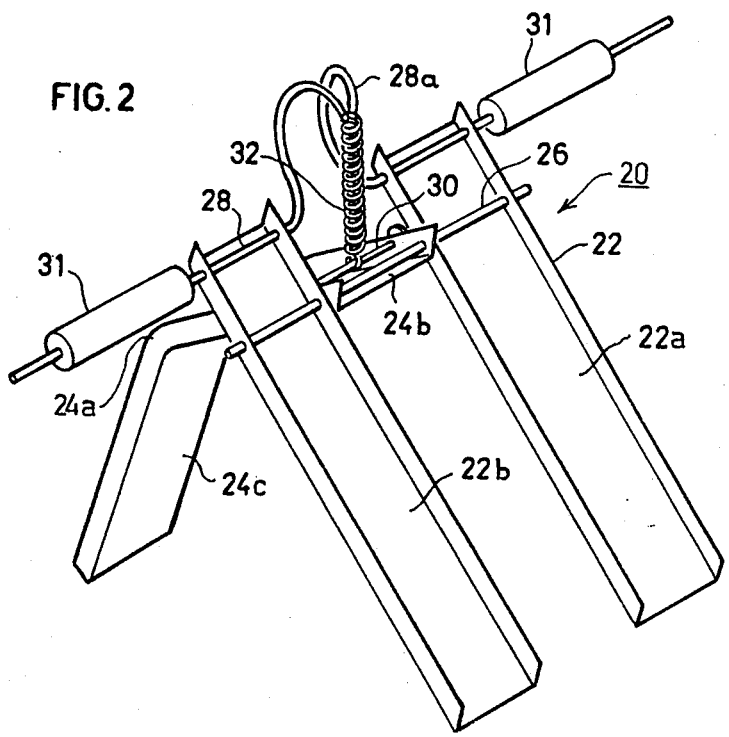
FIG. 2 is a three-dimentional view illustrating the nest trap of FIG. 1.

The construction of nest trap 20 is more particularly illustrated in FIG. 2. It includes a front member, generally designated 22, and a back member 24. Front member 22 is constituted of two bar sections 22a, 22b spaced from each other on opposite sides of the back member 24. As shown particularly in FIGS. 1, 3 and 4, back member 24 is constituted of a single bar but is formed with a bend 24a near its upper end dividing the member into an upper section 24b and a lower section 24c. Bend 24a is at an obtuse angle, for example about 120°.

Figure 4:
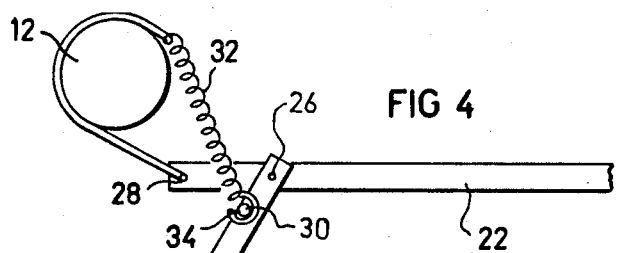
FIG. 4 is a similar view illustrating the open position of the nest trap.
Figure 3:
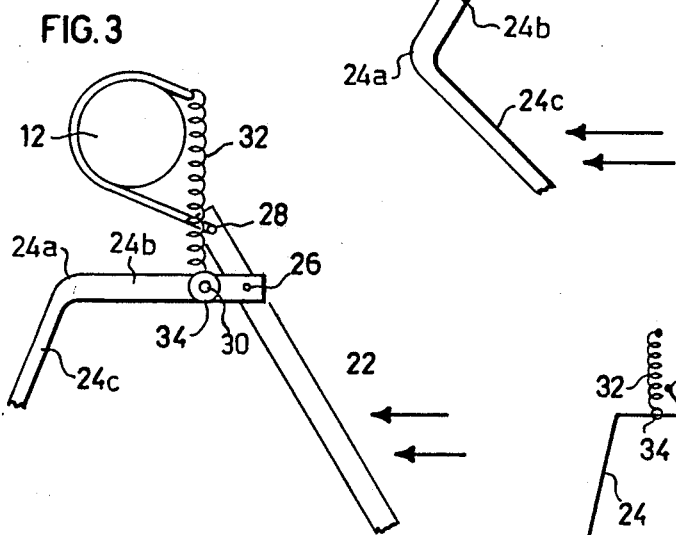
FIG. 3 is a side elevational view illustrating the closed position of the nest trap of FIGS. 1 and 2.

As shown particularly in FIGS. 2–4, a rod 26 is secured across the upper ends of the two front member section 22a, 22b and pivotably mounts the back member 24 between these two sections. The two front member sections 22a, 22b are pivotably mounted at their upper ends to another rod 28 which is fixed to the side walls of the nest enclosure below shaft 12 used for swinging the ejector 10 as described above. Rod 28 is formed with a loop 28a (shown particularly in FIG. 2) overlying the upper section 24b of the back member 24. Section 24b of back member 24 has secured to it further rod 30 extending transversely across the upper end of the back member section 24b, just inwardly of rod 26 pivotably mounting the back member to the two front member sections 22a, 22b. A pair of spacer sleeves 31 enclose rod 28 on opposite sides of the two front sections 22a, 22b of the nest trap. A coiled spring 32 is secured at one end to loop 28a of rod 28, and at the opposite end to rod 30 across the upper end of the back member section 24b.

Figure 5A:
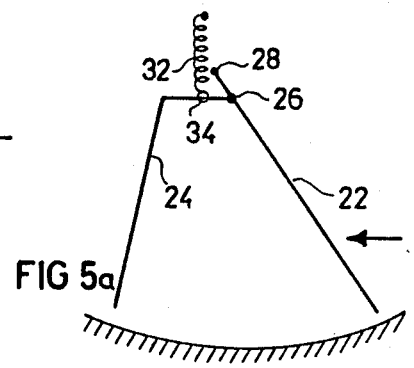
FIGS. 5a–5c illustrate the various operations of the nest trap.
Figure 5B:
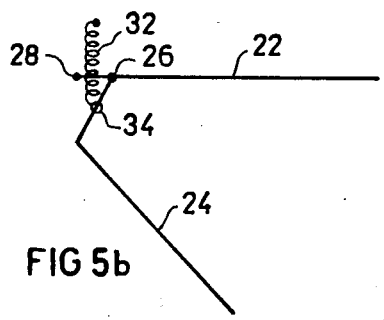

As shown more particularly in FIGS. 3 and 4, the opposite ends of rod 30 carry a pair of limit members 34, each in the form of a disc projecting slightly from the face of back member section 24b facing the front member sections 22a, 22b. Limit members 34 are thus engageable by the front member sections 22a, 22b between the pivot axis (rod 26) of back member 24 with respect to the front member 22, and the pivot axis (rod 28) of front member 22 to the top of the nest. The arrangement is such that when the trap is in its open position, as illustrated in FIGS. 4 and 5b, and the back member 24 is pivoted by a hen entering the nest via its front entrance 2, limit elements 34 engage the upper end of the front member sections 22a, 22b, thereby causing the front member to be pivoted by the back member to close the trap. This will be clear from the description below of the operation of the illustrated trap.

Spring 32 forms two over-center spring connections between the back member 24, the front member sections 22a, 22b and the pivotable mounting of the front member sections to shaft 28, as will also be apparent from the description below of the overall operation.

The open condition of nest trap 20 is illustrated in FIGS. 1, 4, and 5b. In this condition of the nest trap, the front member sections 22a, 22b are in a non-obstructing position with respect to the front entrance 2, namely disposed horizontally above the front entrance, whereas the back member 24 is located in alignment with the front entrance 2 so as to be contacted by a hen entering the cage. As shown particularly in FIGS. 4 and 5b, spring 32 stably maintains the front member 22 and the back member 24 of the nest trap in this open condition.

When a hen enters the nest via entrance 2, the hen engages the lower section 24c of back member 24, and moves that section towards the back wall 4 of the nest. As back member 24 starts to move, its limit members 34 engage the upper end of the front member section 22a, 22b and thereby pivot the front member sections above rod 28 until the lower part of the front member sections 22a, 22b limit against the edge of the front wall defining the front entrance 2. The nest trap is now in its closed position, as illustrated in FIGS. 3 and 5a, with the hen inside, and with the back member 24 moved inwardly close to back wall 4.

As indicated earlier, spring 32 forms an over-center spring connection stably maintaining the nest trap 20 in either its open or closed positions. Thus, as shown in FIGS. 4 and 5b, when the nest trap is in its open position, spring 32 is disposed to one side of the pivot axis (rod 28) of the front member 22; and as front member 22 pivots about rod 28, the axis of the spring moves towards pivot axis 28 and then passes it to the opposite side of the axis in the closed position of the nest trap. This is the condition illustrated in FIGS. 3 and 5a.

It will thus be seen that in this closed condition of the nest trap, the front member sections 22a, 22b obstruct the front entrance 2 of the nest, thereby preventing the entry of another hen while the nest is already occupied by one hen.

As the occupying hen leaves the nest, the hen engages the front member sections 22a, 22b, thereby pivoting the sections about their pivot axis (rod 28) until the axis of spring 32 passes pivot axis 28 to the opposite side, whereupon the spring stably maintains the front member sections 22a, 22b in the open condition of the nest. During this movement of the front member sections 22a, 22b to their open condition, they also move the back member 24 to the open position, as illustrated in FIGS. 4 and 5b. Thus, the nest trap is stably maintained by spring 32 in this open condition, non-obstructing the front entrance 2 so as to permit another hen to enter the nest.

Figure 5C:
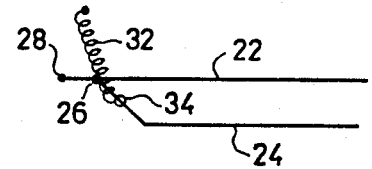

FIG. 5c illustrates a third position of the nest trap, wherein the front member 22 is in its open condition as illustrated in FIG. 5b, and the back member 24 is manually pivoted upwardly out of the nest so as to be substantially parallel to the front member 22. The back member 24 is stably maintained in this position by spring 32 whose axis passes the pivot axis (rod 26) of the back member 24 during this movement of the back member. The back member 24 may be moved out of the nest to the position illustrated in FIG. 5c for acclimatizing the turkey flock when the nest is first used with it, or for facilitating cleaning of the nest.

It has been found that the nest trap construction illustrated in the drawings, particularly its pivotable mounting at an intermediate point to the top wall of the nest rather than over the front wall, substantially increases the reliability of operation of the nest trap and better assures that it will automatically close when a hen enters and automatically open when a hen leaves.

While the invention has been described with respect to one preferred embodiment, it will be appreciated that many other variations, modifications, and applications of the invention may be made.

What is claimed is:

1. A trap for a laying hens nest having a front entrance through which the hen enters and exits, a back wall, and a top, which trap is movable by the hen when entering the nest to a closed position obstructing the front entrance to prevent another hen from entering, the trap being movable by the hen when leaving the nest to an open position to permit another hen to enter the nest; said trap comprising:

a front member pivotably mounting to the top of the nest;

a back member mounted to the upper end of the front member;

and a spring providing an over-center spring connection between said two members effective to stably maintain the back member within the nest and the front member in a non-obstructing position with respect to the front entrance in the open position of the trap, and effective to stably maintain the back member near the back wall of the nest and the front member obstructing the front entrance, in the closed position of the trap;

said back member being pivotably mounted to the upper end of said front member and carrying a limit element engageable by the front member between the pivot point of the back member to the front member and the pivot point of the front member to the top of the nest, such that when the trap is in its open position and the back member is pivoted by a hen entering the nest via its front entrance, said limit element engages the upper end of the front member to cause the back member to be pivoted by the front member to the trap closed position wherein the front member obstructs the front entrance.

2. The nest trap according to claim 1, wherein said spring is connected to the upper end of said back member to provide a second over-center spring connection effective, when both said front member and said back member are moved out of the cage to a non-obstructing position with respect to said front entrance, to also stably maintain said back member in said non-obstructing position with respect to said front entrance.

3. The nest trap according to claim 1, wherein said front member includes two spaced sections disposed on opposite sides of said back member.

4. The nest trap according to claim 3, wherein said back member includes a rod secured across its upper end, there being two of said limit elements carried on the opposite ends of said rod.

5. The nest trap according to claim 4, wherein one end of said spring is connected to said rod secured across the upper end of said back member.

6. The nest trap according to claim 5, wherein the two sections of the front member are secured together by a further rod, the opposite end of said spring being secured to said further rod.

7. The nest trap according to claim 5, wherein said back member is in the form of a flat bar having a bend at an obtuse angle at its upper end.

8. The nest trap according to claim 7, wherein the two sections of said front member are in the form of bars, said back member being pivotably mounted to a further rod secured to and extending between said two bars.

9. A nest for laying hens having a trap in accordance with claim 1, pivotably mounted to said nest.

10. The nest according to claim 9, further including an ejector member pivotably mounted in the nest along the same axis as said nest trap.

11. A nest for laying hens having a front entrance through which the hen enters and exits, a back wall, and a top;

a trap movable by the hen when entering the nest to a closed position obstructing the front entrance to prevent another hen from entering, the trap being movable by the hen when leaving the nest to an open position to permit another hen to enter the nest; said trap comprising: a front member pivotably mounted to the top of the nest at an intermediate position thereof between its front entrance and the back wall; a back member mounted to the upper end of the front member; and a spring providing an over-center spring connection between said two members effective to stably maintain the back member within the nest and the front member in a non-obstructing position with respect to the front entrance in the open position of the trap, and effective to stably maintain the back member near the back wall of the nest and the front member obstructing the front entrance, in the closed position of the trap;

said back member being pivotally mounted to the upper end of the front member, said spring being connected to the upper end of said back member to provide a second over-center spring connection effective, when both said front member and said back member are moved to a non-obstructing position with respect to said front entrance, to also stably maintain said back member in said non-obstructing position with respect to said front entrance.

12. The nest according to claim 11, wherein said back member is pivotably mounted to the upper end of said front member and carries a limit element engageable by the front member between the pivot point of the back member to the front member and the pivot point of the front member to the top of the nest, such that when the trap is in its open position and the back member is pivoted by a hen entering the nest via its front entrance, said limit element engages the upper end of the front member to cause the back member to be pivoted by the front member to the trap closed position wherein the front member obstructs the front entrance.

13. The nest trap according to claim 12, wherein said front member includes two spaced sections disposed on opposite sides of said back member.

14. The nest trap according to claim 13, wherein said back member includes a rod secured across its upper end, there being two of said limit elements carried on the opposite ends of said rod.

15. The nest trap according to claim 14, wherein one end of said spring is connected to said rod secured across the upper end of said back member.

16. The nest trap according to claim 15, wherein the two sections of the front member are secured together by a further rod, the opposite end of said spring being secured to said further rod.

17. The nest trap according to claim 16, wherein said back member is in the form of a flat bar having a bend at an obtuse angle at its upper end; and wherein the two sections of said front member are in the form of bars, said back member bar being pivotably mounted to a further rod secured to and extending between said latter two bars.

* * * * *